United States Patent
Shaffer et al.

[11] Patent Number: 5,966,427
[45] Date of Patent: Oct. 12, 1999

[54] APPARATUS AND METHOD FOR TROUBLESHOOTING INTERNET PROTOCOL TELEPHONY NETWORKS

[75] Inventors: Shmuel Shaffer, Palo Alto; William Joseph Beyda, Cupertino, both of Calif.

[73] Assignees: Siemens Information; Communications Networks, Inc., both of Boca Raton, Fla.

[21] Appl. No.: 08/941,144

[22] Filed: Sep. 30, 1997

[51] Int. Cl.[6] .................................................. H04M 1/24
[52] U.S. Cl. .................... 379/1; 379/5; 379/6; 379/29; 379/27; 379/21; 379/900
[58] Field of Search .................................... 379/1, 900, 5, 379/6, 9, 10, 12, 15, 16, 18, 22, 23, 28, 26, 29; 370/249, 241, 242, 247, 250; 395/185.1, 500; 348/180, 193, 185, 181

[56] References Cited

U.S. PATENT DOCUMENTS

| | | | |
|---|---|---|---|
| 5,265,239 | 11/1993 | Ardolino | 395/500 |
| 5,301,050 | 4/1994 | Czerwiec et al. | 379/29 |
| 5,446,781 | 8/1995 | Lindstrom et al. | 379/5 |
| 5,495,516 | 2/1996 | Lee et al. | 379/1 |
| 5,502,756 | 3/1996 | Crocker et al. | 379/29 |
| 5,530,367 | 6/1996 | Bottman | 324/616 |
| 5,629,931 | 5/1997 | Kausel | 379/1 |
| 5,636,260 | 6/1997 | Chopping | 379/29 |
| 5,659,684 | 8/1997 | Giovannoni et al. | 395/200.8 |
| 5,774,524 | 6/1998 | Yang | 379/1 |
| 5,774,640 | 6/1998 | Kurio | 395/182.02 |
| 5,784,558 | 7/1998 | Emerson et al. | 395/200.6 |
| 5,805,668 | 9/1998 | Kim | 379/9 |
| 5,825,849 | 10/1998 | Garland et al. | 379/5 |
| 5,898,674 | 4/1999 | Mahwhinney et al. | 370/247 |

*Primary Examiner*—Curtis A. Kuntz
*Assistant Examiner*—Rexford N. Barnie

[57] ABSTRACT

A device and method for IP telephony troubleshooting include multiple alternative input/output members for connecting the troubleshooting device to an IP telephony network at one of multiple sites within the IP telephony network. A system control connected to one of the connector members transmits and receives digital control messages to establish a bidirectional audio communications link over the IP telephony network. A system control user interface connected to the system control enables a user to direct a call to a remote telephonic device. A converter, connected to one of the connector members, converts digital audio signals received from the remote telephonic device to analog audio signals and converts analog audio signals generated by a microphone to digital audio signals for transmission to the remote telephonic device. An interface obtains synchronization with the remote telephonic device to facilitate synchronous data communication. In an alternative embodiment, the IP telephony troubleshooting device is an IP telephony adaptor for an analog telephony troubleshooting device.

20 Claims, 7 Drawing Sheets

APPARATUS AND METHOD FOR TROUBLESHOOTING INTERNET PROTOCOL TELEPHONY NETWORKS

BACKGROUND OF THE INVENTION

The invention generally relates to troubleshooting telecommunications networks and more specifically to troubleshooting Internet protocol (IP) telephony networks.

DESCRIPTION OF THE RELATED ART

IP telephony has opened up networks such as local area networks (LAN), intranets, internets, and the Internet, which were originally designed for data communication, to be utilized for audio communication as well. Furthermore, the promulgation of the H.323 standard for line transmission of non-telephone signals by the International Telecommunications Union (ITU) provides a standard for IP telephony which obviates many of the incompatibility problems between different IP telephonic devices which previously hindered utilization of IP telephony.

IP telephony provides numerous benefits to network users. The high bandwidth available on networks such as LANs and intranets can support such call features as call forwarding, call waiting, and caller ID in addition to numerous other features. The higher bandwidth also supports parallel transmission of interactive video and images, enabling video teleconferencing along with telephony capabilities. Furthermore, IP telephony provides significant flexibility to accommodate the needs of a user, even as these needs change over time. For instance, a business might install a self-contained LAN in its office building. Initially, the IP telephony connecting the various terminals in the office building operates essentially as an intercom system. If the business subsequently desires to connect its IP telephony to a larger network, it can connect an ISDN line to a gateway associated with its LAN and in this manner gain access to any other IP telephony networks connected to the ISDN. Alternatively the gateway of the LAN could be utilized to connect directly to the gateways of several other LANs, thereby forming an internet, or the gateway could be used to connect the LAN to a T1 carrier or to a private branch exchange.

Although the benefits and advantages of IP telephony described above are readily apparent, there exists no practical and effective means for troubleshooting IP telephony networks. For analog telephony networks as well as ISDN, there exist telephony troubleshooting devices which enable a technician to connect to a line on the network and, in the case of the analog networks, establish whether the line has a dial tone. If a dial tone is obtained, the analog troubleshooting device can then place and receive calls to verify that a line on the network can support bidirectional audio communications. ISDN lines do not have dial tones, so when the ISDN telephony troubleshooting device is connected to an ISDN line and turned on, a liquid crystal display (LCD) shows the status of the troubleshooting device as it goes through a series of line diagnostics. Upon synchronizing with the phone company switch, the ISDN telephony troubleshooting device can place and take calls over the ISDN line. At this time there is no telephony troubleshooting device for IP telephony networks equivalent to those provided for analog and ISDN telephony networks.

A device commonly known as a LAN sniffer is capable of troubleshooting a LAN to determine data communication capability of the different connections within a LAN. However, although the LAN sniffer tests the data communication capability of a LAN, it does not test the audio communication capability of a network.

What is needed is a device and method for performing troubleshooting on an IP telephony network at multiple sites within the network to determine whether at least a portion of the network is capable of supporting bidirectional audio communication.

SUMMARY OF THE INVENTION

A telephony troubleshooting device includes multiple alternative input/output members for connecting the telephony troubleshooting device to an IP telephony network at one of multiple sites within the IP telephony network. A system control is configured for an electrical association with any one of the connector members and for transmitting and receiving digital control messages to establish a bidirectional audio communication link over the IP telephony network. A system control user interface connected to the system control enables a user of the telephony troubleshooting device to direct a call to a remote telephonic device. A converter connected to one of the connector members converts a first digital audio signal received from the remote telephonic device to a first analog audio signal and converts a second analog audio signal to a second digital audio signal transmitted to the remote telephonic device. A speaker connected to the converter is responsive to the first analog audio signal, and a microphone connected to the converter converts speech into the second analog audio signal.

In another embodiment, the telephony troubleshooting device is an adaptor connected to an analog telephony troubleshooting device which includes, in addition to a system control and multiple connectors, an electrical circuit for converting an analog DTMF signal generated by the analog telephony troubleshooting device to a first digital control message. A converter is connected to a microphone and a speaker of the analog telephony troubleshooting device for converting a first digital audio signal received from a remote telephonic device to a first analog audio signal transmitted to the speaker and for converting a second analog audio signal generated by the microphone of the analog telephony troubleshooting device to a second digital audio signal transmitted to the remote telephonic device.

A method for troubleshooting an IP telephony network includes connecting a hand-held telephony troubleshooting device to an IP telephony network. A first digital telephony signal is transmitted from the telephony troubleshooting device via the IP telephony network to a remotely located device, the first signal containing information requesting a return digital telephony signal from the remotely located device. The signal exchange between the telephony troubleshooting device and the remotely located device is necessary to establish a bidirectional audio communication capability over the IP telephony network. The connection between the telephony troubleshooting device and the remotely located device is monitored to determine whether the return telephony signal is received. If it is determined from the monitoring step that the return signal is received, a loopback call is executed wherein an audio test signal is transmitted over the IP telephony network, the loopback call being directed to an address assigned to the telephony troubleshooting device. A determination is made whether the audio test signal is received by the telephony troubleshooting device. If the audio test signal is received, the received signal is analyzed to determine the performance characteristics of the transmission of the audio test signal over the IP telephony network.

DETAILED DESCRIPTION

Figure 1:
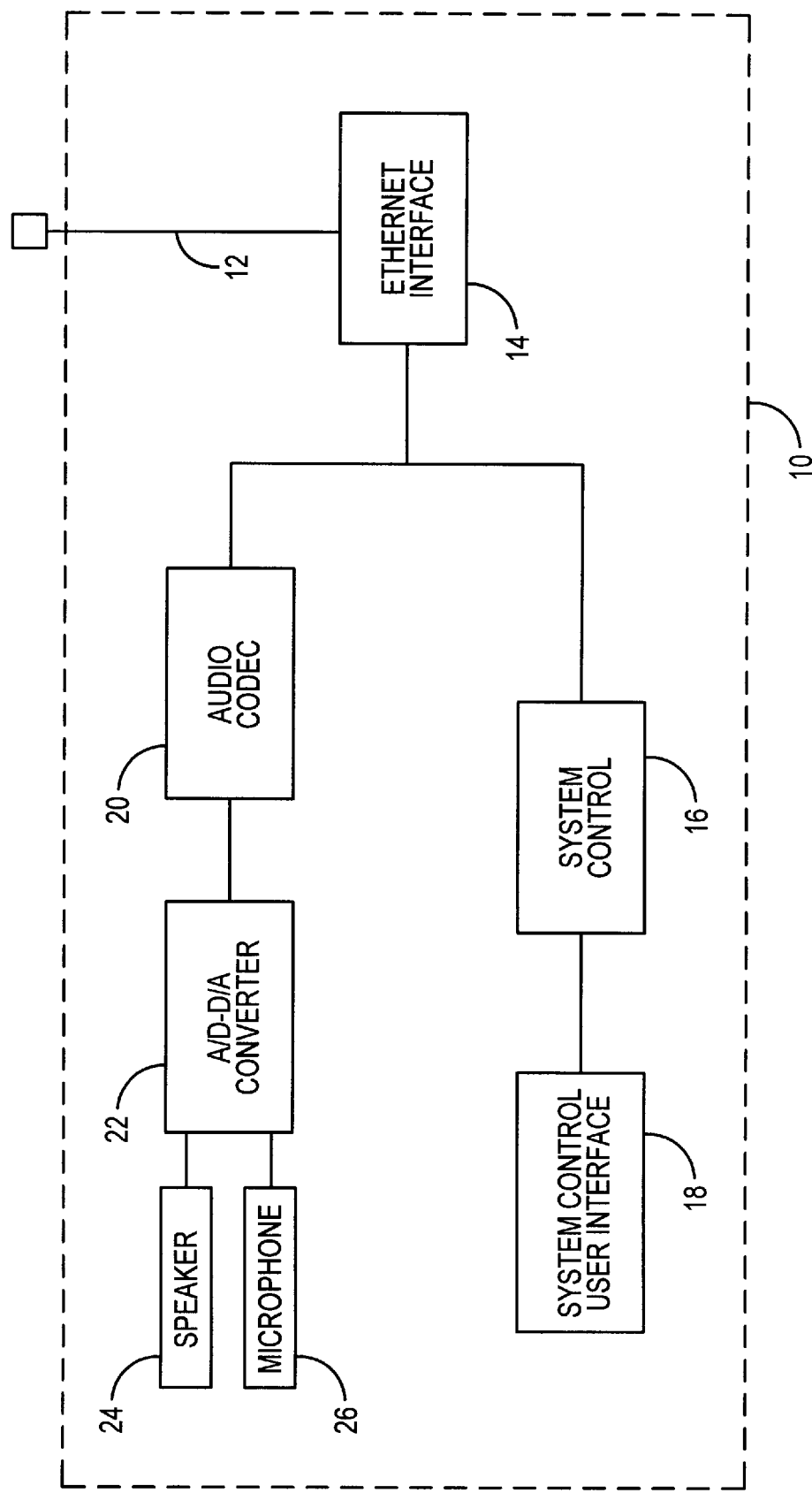
FIG. 1 is a block diagram of an IP telephony troubleshooting device according to the present invention.

FIG. 1 illustrates an IP telephony troubleshooting device 10 according to the claimed invention. The IP telephony troubleshooting device will be described by way of an example wherein the IP telephony troubleshooting device performs troubleshooting operations on an internetworked LAN and the specifications of the IP telephony troubleshooting device 10 conform to the standards articulated in the International Telecommunications Union H.323 standards for Visual Telephone Systems and Equipment for Local Area Networks Which Provide a Non-Guaranteed Quality of Service. The claimed IP telephony troubleshooting device and methods can be practiced on many different types of networks including the Internet, intranetworks, and internetworks, as well as a variety of LANs including Ethernet and Token Ring.

The IP telephony troubleshooting device 10 is preferably a hand-held device that includes a connector 12 for connecting the IP telephony troubleshooting device to a LAN. The connector is one of a set of connectors for connecting the IP telephony troubleshooting device at a number of different sites within the LAN. The set of connectors includes an RJ45 connection for connecting the IP telephony troubleshooting device 10 at either a wall jack of a LAN terminal or an ethernet hub. The set of connectors further includes alligator clips which can be utilized to connect the IP telephony troubleshooting device to the LAN at any accessible portion of the LAN cable connecting the various LAN terminals. An ethernet LAN interface 14, or an equivalent such as an RS-232, provides a point of connection for one of the set of connectors. A system control 16 is connected to the ethernet interface 14 to provide control messages necessary to establish a bidirectional audio communication link over the LAN and to perform various troubleshooting functions. A system control user interface 18 includes a set of keypads to enable a user of the IP troubleshooting device to enter an address of a called endpoint and regulators to control the levels of a speaker 24 and a microphone 26. An audio codec 20 connected via the ethernet interface to a connector compresses, decompresses, and packetizes audio signals transmitted and received by the IP telephony troubleshooting device. An analog/digital converter 22 is connected to both the speaker 24 and the microphone 26 to convert analog audio signals generated by the microphone 26 to digital audio signals and to convert digital audio signals received from a remote IP telephony device to analog audio signals transmitted to the speaker 24.

The set of connectors used to connect the IP telephony troubleshooting device 10 to the LAN enable troubleshooting at multiple sites within the LAN. The ability to connect to the LAN at multiple sites is critical to pinpointing the cause of a malfunction within the LAN. For instance, with reference to FIG. 7, if IP telephony terminal 106 is not functioning properly, any number of causes outside of a malfunction in the terminal itself could be responsible. The connection between the terminal 106 and the bus 108 might be inoperative, the bus 108 itself might be inoperative, or router #1 110 might be malfunctioning. Connecting the IP troubleshooting device 10 at various sites between the IP telephony terminal 106 and the router 110 utilizing the different adaptors can isolate the source of the malfunction.

Figure 7:
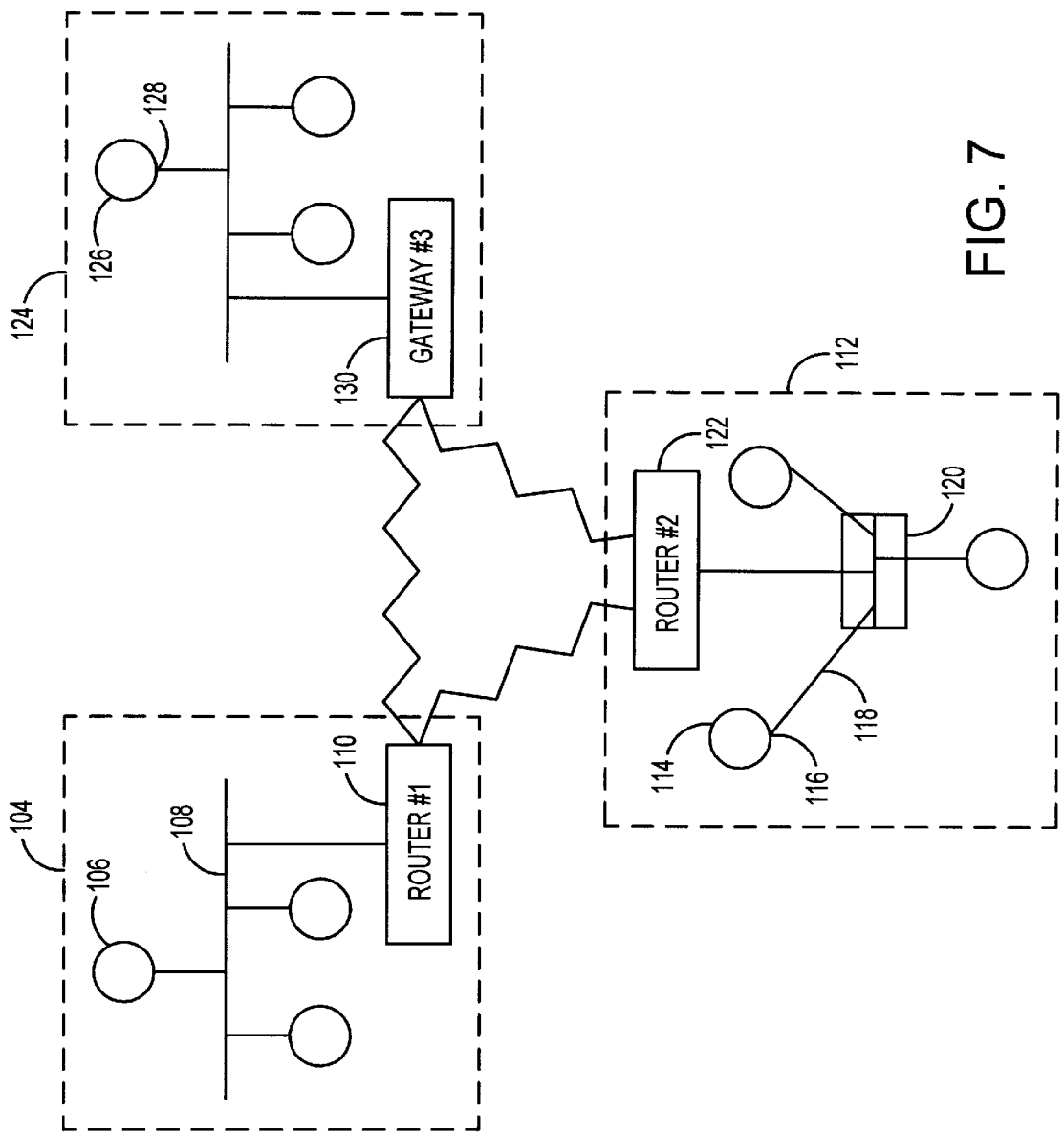
FIG. 7 is a diagram of various sites on an IP telephony network in which the IP telephony troubleshooting devices of FIG. 1 or 2 operate.

One of the connectors is an RJ45 connector which is used to connect the IP troubleshooting device 10 to a wall jack of a terminal on the LAN. With reference to FIG. 7, if terminal 114 within LAN #2 112 is not functioning properly, the IP telephony troubleshooting device 10 is plugged into the wall jack 116. If it is possible to place and receive calls with the IP telephony troubleshooting device from the wall jack 116, then it is clear that a malfunction in terminal 114 is responsible for the inability of the terminal to make and receive calls. If no telephony is accessible from the user wall jack 116, an alligator clip can be used to connect the troubleshooting device 10 to the network at a site 118 within the cable connecting the terminal 114 to the hub 120 of LAN #2 112. If telephony is accessible at site 118, then the wall jack connection is most likely faulty. The RJ45 connector can also be used to connect the IP telephony troubleshooting device 10 at the hub 120 to test the connection between the hub and router #2 122.

Adaptors are provided which enable the IP telephony troubleshooting device 10 to connect to various ports of a router associated with a LAN. For instance, an RS-449 adaptor and an ethernet adaptor enable the IP telephony troubleshooting device to connect to an RS-449 port of the router and an ethernet port of the router, respectively. With reference to FIG. 7, an RS-449 adaptor is used to connect the IP telephony troubleshooting device to an RS-449 port of router #2 122 to perform remote troubleshooting of LAN #1 104. A call is placed to terminal 106 through router #1. Assuming router #2 is functioning properly, if router #1 122 does not respond, then either the connection between router #2 122 and router #1 is faulty, or router #1 110 is malfunctioning. If router #1 responds, but is unable to facilitate a connection between the IP telephony troubleshooting device 10 and IP terminal 106, then either the connection between router #1 110 is faulty, or IP terminal 106 is malfunctioning.

Returning to FIG. 1, the ethernet interface 14 provides a physical interface between the LAN and the IP telephony troubleshooting device 10 to conform the signals generated by the IP telephony troubleshooting device to a standard common to the various terminals connected to the IP telephony network. The ethernet interface also causes a remote IP telephony device, for example, a server, to synchronize with the IP telephony troubleshooting device to facilitate synchronous transmission of signals between the IP telephony troubleshooting device 10 and the server.

The system control 16 generates control messages transmitted to remotely located IP telephony devices and receives control messages from the remotely located devices. For example, in FIG. 7, to call terminal 106 of LAN #1 104 using the IP telephony troubleshooting device 10 from the wall jack 128 where terminal 126 is located, the system control will first transmit an Admission Request (ARQ) message to gateway #3 130 of LAN #3 124. If gateway #3 is functioning properly, it will transmit a responsive control message of either Admission Confirmed (ACF) or Admission Rejected (ARJ). This exchange of control messages between the IP telephony troubleshooting device 10 and gateway #3 130 is necessary to establish a bidirectional communication link between the IP telephony troubleshooting device 10 and terminal 106. If the troubleshooting device 10 is utilized to call a terminal (not shown) on a LAN which is not registered to a server, then the system control generates a Setup message for transmission to the terminal. If the terminal receives the Setup message and the terminal is functioning properly, the terminal responds by transmitting a Connect message, which, if received by the system control 16, establishes a bidirectional audio communications link between the terminal and the troubleshooting device 10.

The system control 16, in addition to performing call signaling operations described above, also performs specific analysis operations. For instance, when the ethernet interface 14 causes a server to synchronize with the IP telephony troubleshooting device as described above, the system control determines whether the troubleshooting device 10 and the server were successfully synchronized. If the troubleshooting device 10 and the server were unable to synchronize, then an indicator on the troubleshooting device communicates the failed synchronization attempt to a user of the troubleshooting device 10 as a cause for IP telephony failure on the LAN. The system control 16 is also able to interpret responses to call signaling messages to identify protocol incompatibility as the source for IP telephony failure on the LAN. For instance, if the system control transmits an ARQ message to a server which is equipped with an H.323 protocol which is incompatible with the H.323 protocol on the troubleshooting device 10, then the system control is able to recognize the response from the server reflecting an incompatibility of H.323 protocols. Furthermore, the system control 16 is able to ascertain the bandwidth availability of a connection in communicating with a server. The system control compares the available bandwidth on a connection within the LAN with the bandwidth necessary to support a bidirectional audio communications link, and thereby determines whether sufficient bandwidth is available to make a particular call. If insufficient bandwidth is available, then the system control causes an indicator on the troubleshooting device 10 to communicate this information to the user.

Connected to the system control 16 is a system control user interface 18. Included in the system control user interface is a keyboard or set of keypads which enables the user to enter the address of an IP telephony terminal to which the user wishes to place a call. Volume adjustment devices for the speaker and microphone are also part of the system control user interface 18. A display, such as an LCD, provides a user with messages which communicate results of troubleshooting operations performed by the system control 16 discussed above. For instance, if the system control determines that the troubleshooting device and the server are unable to communicate because of incompatible versions of H.323 protocol, then the LCD would display a message which indicates H.323 protocol incompatibility.

The audio codec 20 codes audio signals generated by the microphone 26 and decodes audio signals received from a remote IP telephony terminal. It also packetizes the signals for efficient transmission to the remote IP telephony terminal. Compression of the audio signals is important to minimize the bandwidth occupied by an audio communications link since, as previously noted, bandwidth scarcity on the LAN can account for failure to establish a link.

The converter 22, positioned between the speaker 24 and microphone 26 on one side and the audio codec 20 on the other, converts the analog audio signals generated by the speaker 24 to digital audio signals. This conversion to digital signals is necessary for transmission of the audio signals over the IP telephony network. The converter 11 also converts incoming digital signals from a remote telephonic device to analog signals to which the speaker 26 is responsive.

Figure 2:
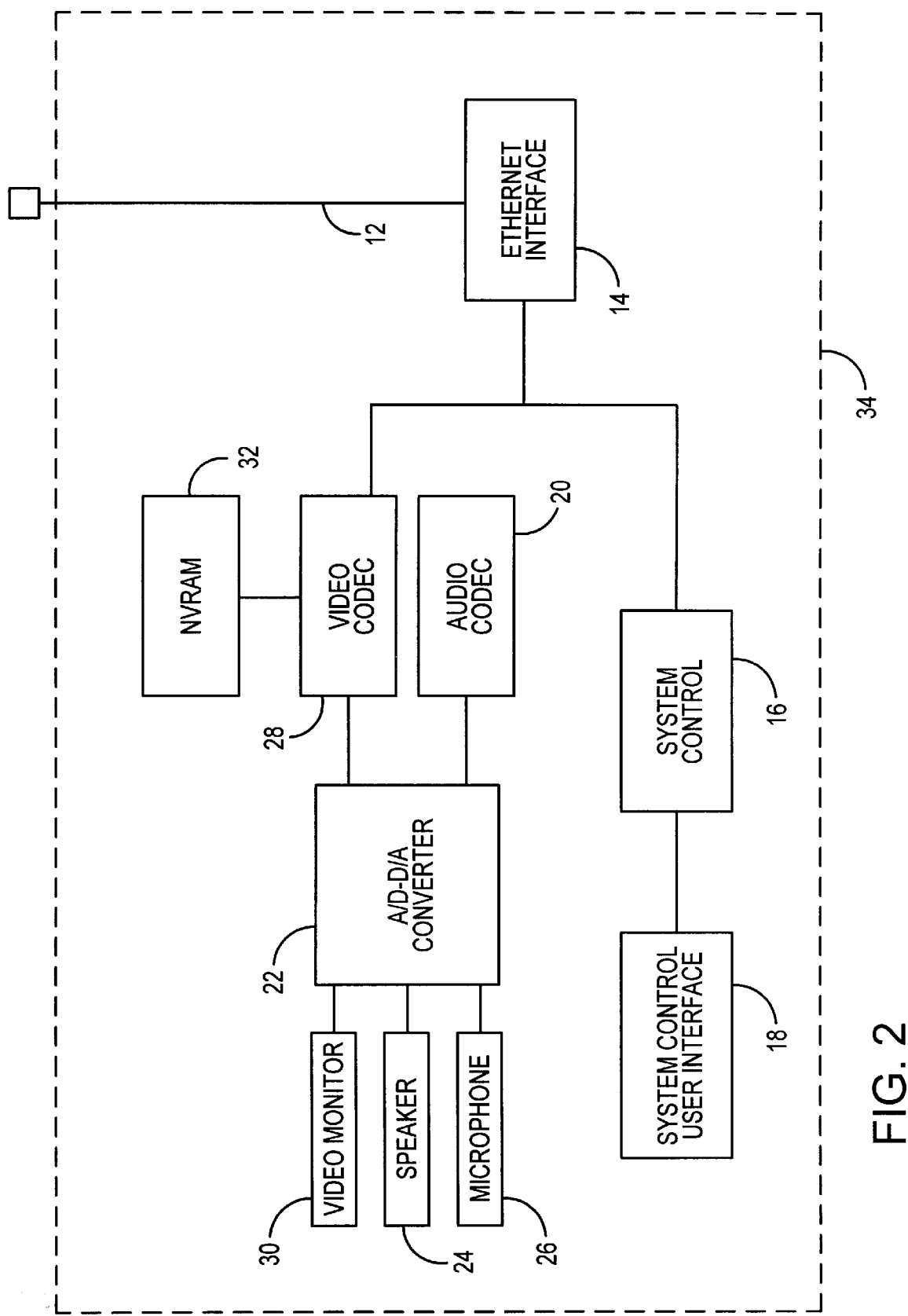
FIG. 2 is a block diagram of a video-enabled embodiment of the IP telephony troubleshooting device illustrated in FIG. 1.

FIG. 2 illustrates an alternative embodiment of the IP telephony troubleshooting device wherein video troubleshooting capabilities are integrated into the IP telephony troubleshooting device. The video-enabled IP telephony troubleshooting device 34 is configured in the same manner as the non-video-enabled embodiment described in FIG. 1 with the exception that a video codec 28 is connected to the ethernet interface 14 and the A/D-D/A converter 22. The video codec compresses and decompresses video signals and packetizes the signals for transmission over the LAN in the same manner as the audio codec performs these functions on audio signals. The video codec is also connected to a non-volatile random access memory (NVRAM) which stores a video sequence for transmission over the LAN as a video test sequence. Storage of the video sequence in NVRAM is more economical and efficient than attaching a video camera to generate a video sequence. A video monitor 30 is connected to the A/D-D/A converter 22 for displaying the video sequence. The A/D-D/A converter converts digital video signals received over the LAN to analog video signals for use by the monitor. Alternatively, a converter may be integrally incorporated within the monitor.

Figure 3:
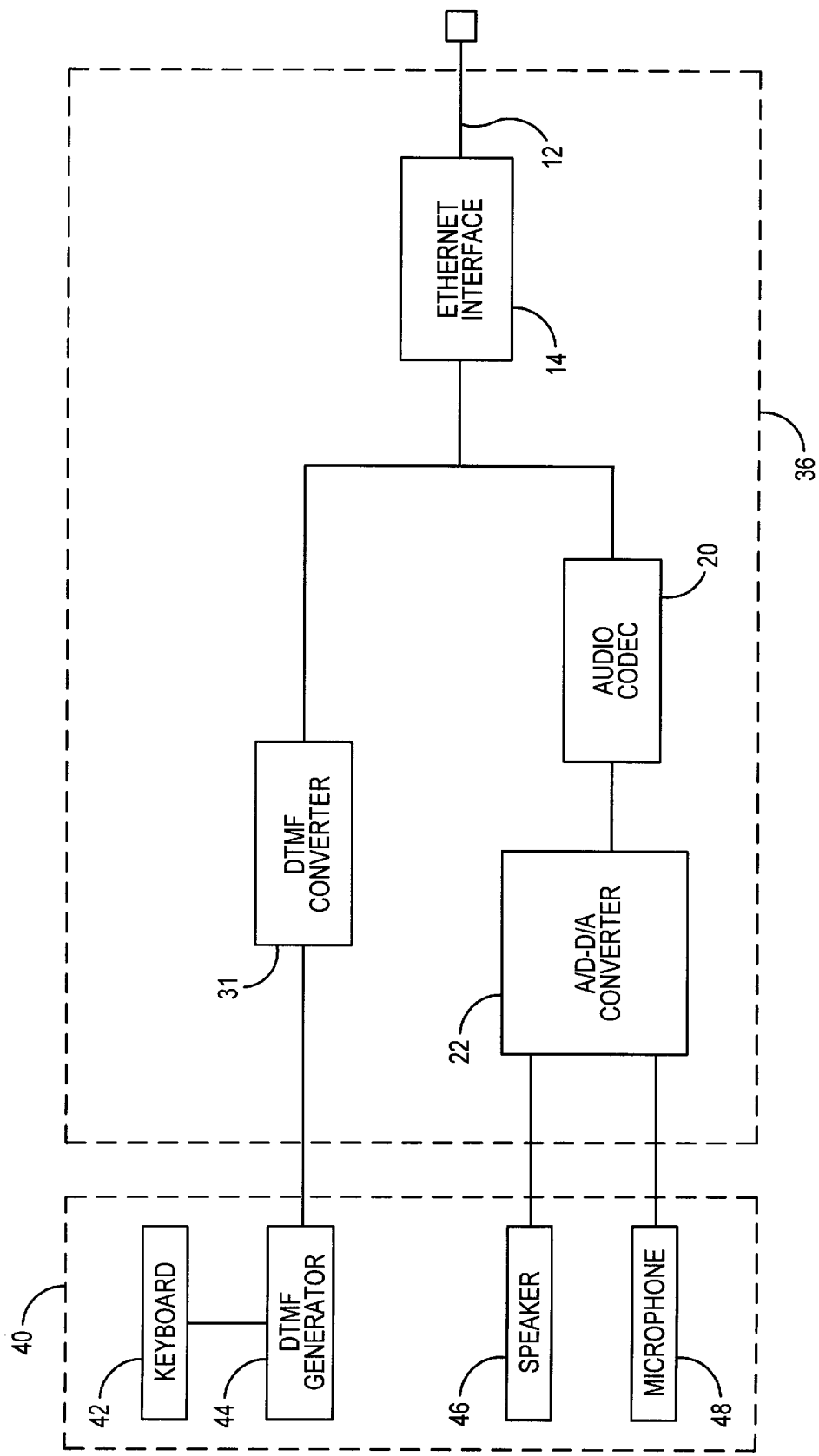
FIG. 3 is an alternative embodiment of the IP telephony troubleshooting device of FIG. 1 wherein the IP telephony troubleshooting device is an adaptor associated with an analog telephony troubleshooting device.

FIG. 3 illustrates an alternative embodiment of the IP telephony troubleshooting device wherein the IP telephony troubleshooting device is an IP telephony adaptor 36 associated with an analog troubleshooting device. The IP telephony adaptor enables analog telephony troubleshooting devices to troubleshoot IP telephony networks. Similar to the stand-alone IP telephony troubleshooting embodiment described above, the adaptor 36 employs multiple connectors to connect to a LAN at multiple sites. An ethernet interface 14 provides an input/output connection for a connector 12, and a system control (not shown) is connected to the ethernet interface. Also connected with the ethernet interface are an audio codec 20 and a converter 31.

Unlike the stand-alone IP telephony troubleshooting device embodiment, the adaptor 36 interfaces with an analog telephony troubleshooting device 40 by way of the dual tone multifrequency (DTMF) converter 31 and the analog-to-digital/digital-to-analog (A/D-D/A) converter 22. The DTMF converter receives a DTMF signal from a DTMF generator 44. The DTMF signal is generated when a user depresses one of the keypads on the keyboard 42 of the analog troubleshooting device 40. For instance, when the key representing digit "9" is depressed, a corresponding DTMF signal is generated by the DTMF generator. The DTMF signal must then be converted to the same signal generated by the system control user interface 18 in the stand-alone embodiment when a user depresses key "9" on the keypad of the system control user interface 18. Thus, the DTMF generator 44 and keyboard 42 of the analog troubleshooting device 40 in conjunction with the DTMF converter 31 of the IP telephony adaptor are the equivalent of the keyboard of the system control user interface 18 in the stand-alone embodiment of FIG. 1. The A/D-D/A converter 22 is structurally and functionally equivalent to the A/D-D/A converter in the stand-alone embodiment, except that it is connected to a speaker 46 and microphone 48 of the analog troubleshooting device.

Figure 4:
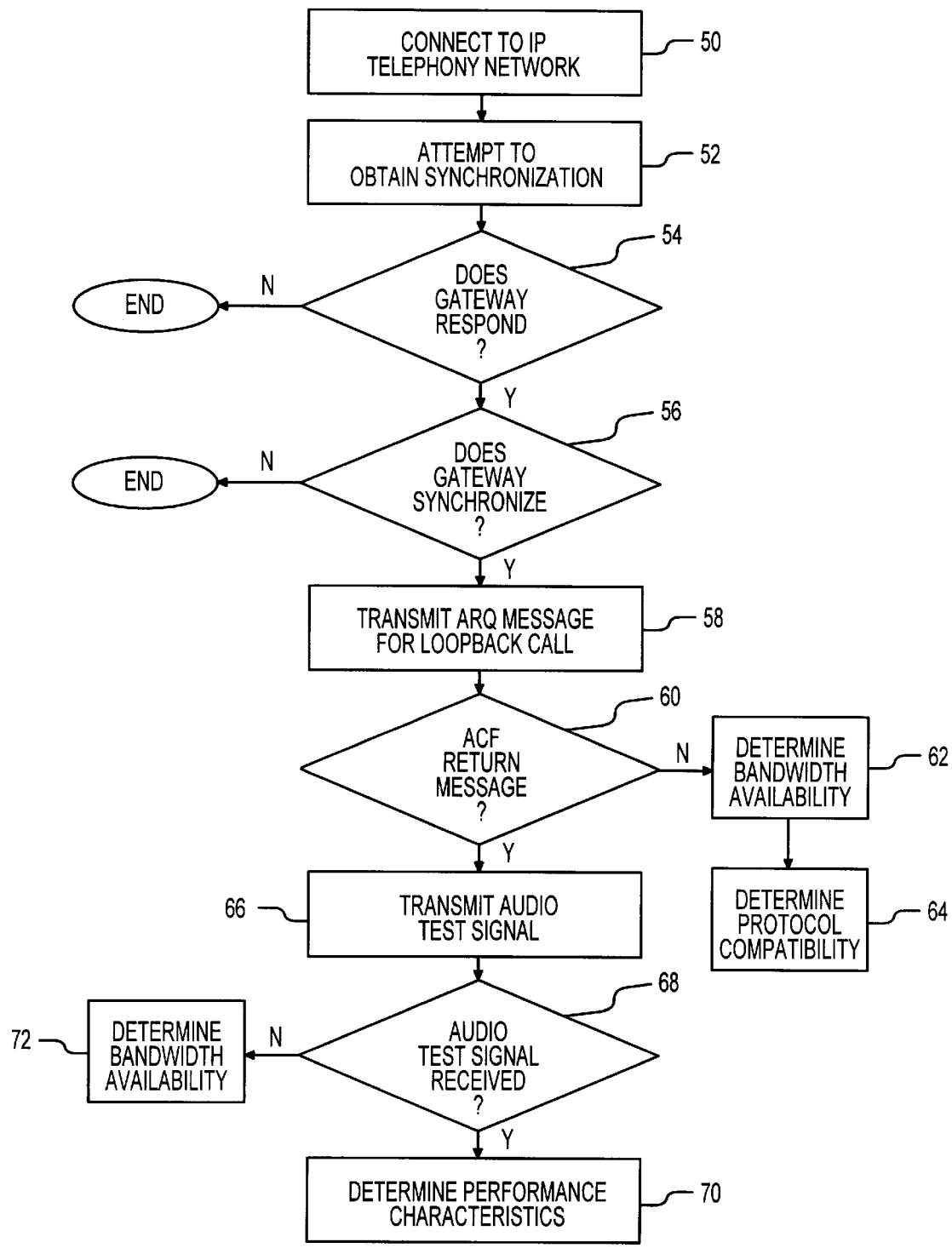
FIG. 4 is a flow diagram illustrating the steps of a method for operating the IP telephony troubleshooting device of FIG. 1.

FIG. 4 illustrates a method of troubleshooting a LAN according to the claimed invention. Either the stand-alone IP telephony troubleshooting device 10 of FIG. 1 or the IP telephony adaptor 36 of FIG. 3 may be utilized. However, for the sake of brevity, the stand-alone embodiment is discussed below. In step 50, the IP telephony troubleshooting device 10 is connected to a LAN utilizing one of the set of connectors. In step 52, the ethernet interface 14 is utilized to obtain synchronization with a gateway associated with the LAN. Synchronization is necessary to facilitate synchronous data communication. If the gateway does not synchronize, then either the connection between the IP telephony troubleshooting device 10 and the gateway is faulty or the gateway is not functioning properly. Instep 56, the IP telephony troubleshooting device makes the determination whether the gateway synchronizes with the IP telephony troubleshooting device. If the gateway responds by signaling that it is unable to synchronize, then it can be deduced that the line connecting the IP telephony troubleshooting device is capable of supporting at least data communication and that the gateway is incapable of facilitating audio communication establishment on the LAN. If the gateway synchronizes, then in step 58 the IP telephony troubleshooting device transmits an admission request (ARQ) message to the gateway to establish a loopback call. The loopback call is a call which the IP telephony troubleshooting device directs to itself to determine the performance characteristics of audio signal transmissions over the LAN. The loopback call is particularly useful when installing a LAN and no terminals are yet installed on the LAN to call to test the connections of the LAN.

In step 60, the IP telephony troubleshooting device 10 determines whether the gateway has returned an admission confirmed (ACF) message or an admission rejected (ARJ) message. If the gateway does not transmit an ACF message, then in steps 62 and 64 the IP telephony troubleshooting device attempts to determine the cause for the failed attempt to execute the loopback call. The determination of the cause for the failed call attempt is important, because the cause of the failure may lie in some incompatibility between the IP telephony troubleshooting device and the gateway or some transient condition in the LAN rather than some malfunctioning component of the LAN which requires repair. In step 62, the bandwidth availability of the loopback connection is ascertained to determine if insufficient bandwidth exists to support the call. In step 64, the IP telephony troubleshooting device determines whether a protocol incompatibility is responsible for the failed loopback call. For instance, the H.323 protocol version which the IP telephony troubleshooting device employs might be incompatible with the version which the gateway employs. If the loopback call fails because of bandwidth unavailability, then the cause of the failure is a temporary congestion on the LAN. If the LAN is routinely overloaded, then a reconfiguration of the LAN might be in order. On the other hand, if the loopback call failure is due to a protocol incompatibility between the IP telephony troubleshooting device and the gateway, then the failure has nothing to do with the LAN or its components and this information greatly affects the interpretation of the significance of the failed call attempt.

If the gateway transmits an ACF signal, then the loopback connection is established and an audio test signal is transmitted by the IP telephony troubleshooting device 10 over the connection in step 66. In step 68, the IP telephony troubleshooting device 10 determines whether the audio test signal has been received. Failure of the audio test signal to be transmitted back to the IP telephony troubleshooting device indicates that the loopback connection is unable to support bidirectional audio communication. At this point, the IP telephony troubleshooting device once again ascertains whether insufficient bandwidth availability caused the transmission failure of the audio test signal in step 72.

If the audio test signal transmission is successful, then in step 70 the received audio test signal is analyzed to determine the performance characteristics of the signal transmission. The frequency and amplitude of the received audio test signal are compared to the frequency and amplitude of the transmitted test signal to determine the quality of the transmission.

Figure 5:
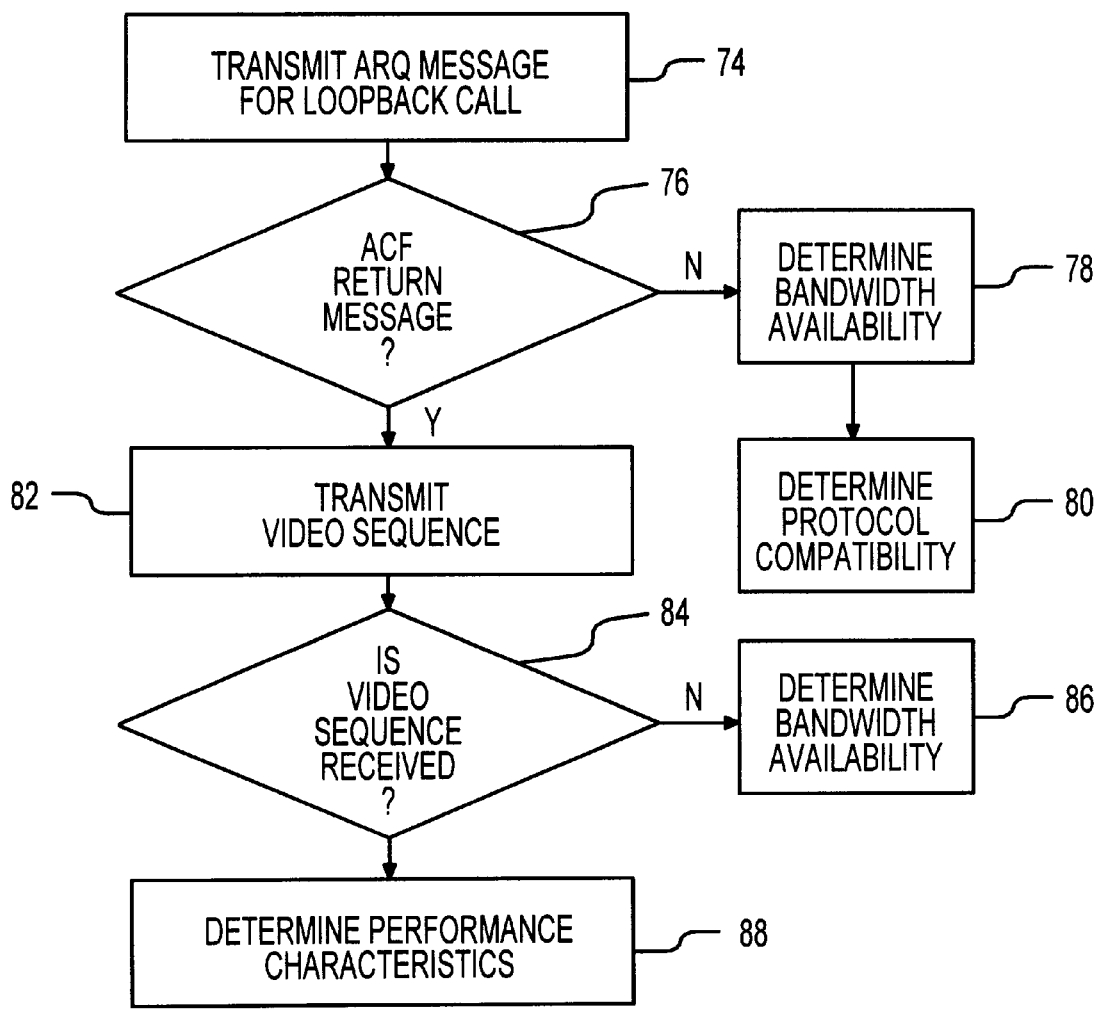
FIG. 5 is a flow diagram illustrating a method of using the video-enabled IP telephony troubleshooting device illustrated in FIG. 2.

FIG. 5 illustrates a method for troubleshooting a LAN utilizing the video-enabled IP telephony troubleshooting device 34. Though not shown in FIG. 5, steps 50 through 56 illustrated in FIG. 4 and discussed above are performed by the video-enabled IP telephony troubleshooting device in the same manner as the non-video-enabled embodiment. In step 74 the video-enabled IP telephony troubleshooting device transmits an ARQ message to the gateway to establish a loopback call. In step 76, the video-enabled IP telephony troubleshooting device 34 determines whether the gateway has responded with an ACF message. If the gateway does not respond with an ACF message, then in step 78 the video-enabled IP telephony troubleshooting device determines whether insufficient bandwidth is responsible for the failed attempt to set up the call. In step 80, the video-enabled troubleshooting device 34 determines whether a protocol incompatibility between the gateway and the video-enabled troubleshooting device is responsible for the failed call attempt.

If the gateway transmits an ACF signal, then the loopback connection is established and, in step 82, the video-enabled IP troubleshooting device 34 transmits the video sequence stored in NVRAM 32 over the loopback connection. In step 84, it is determined whether the video sequence is received. Failure of the video sequence to be transmitted back to the video enabled troubleshooting device indicates that the loopback connection is unable to support video transmission. If the transmission has failed, then in step 86 the video-enabled troubleshooting device determines whether insufficient bandwidth availability is responsible. If the video sequence is received, then the video monitor 30 is used to view the video sequence to determine the performance characteristics of the transmission in step 88.

Figure 6:
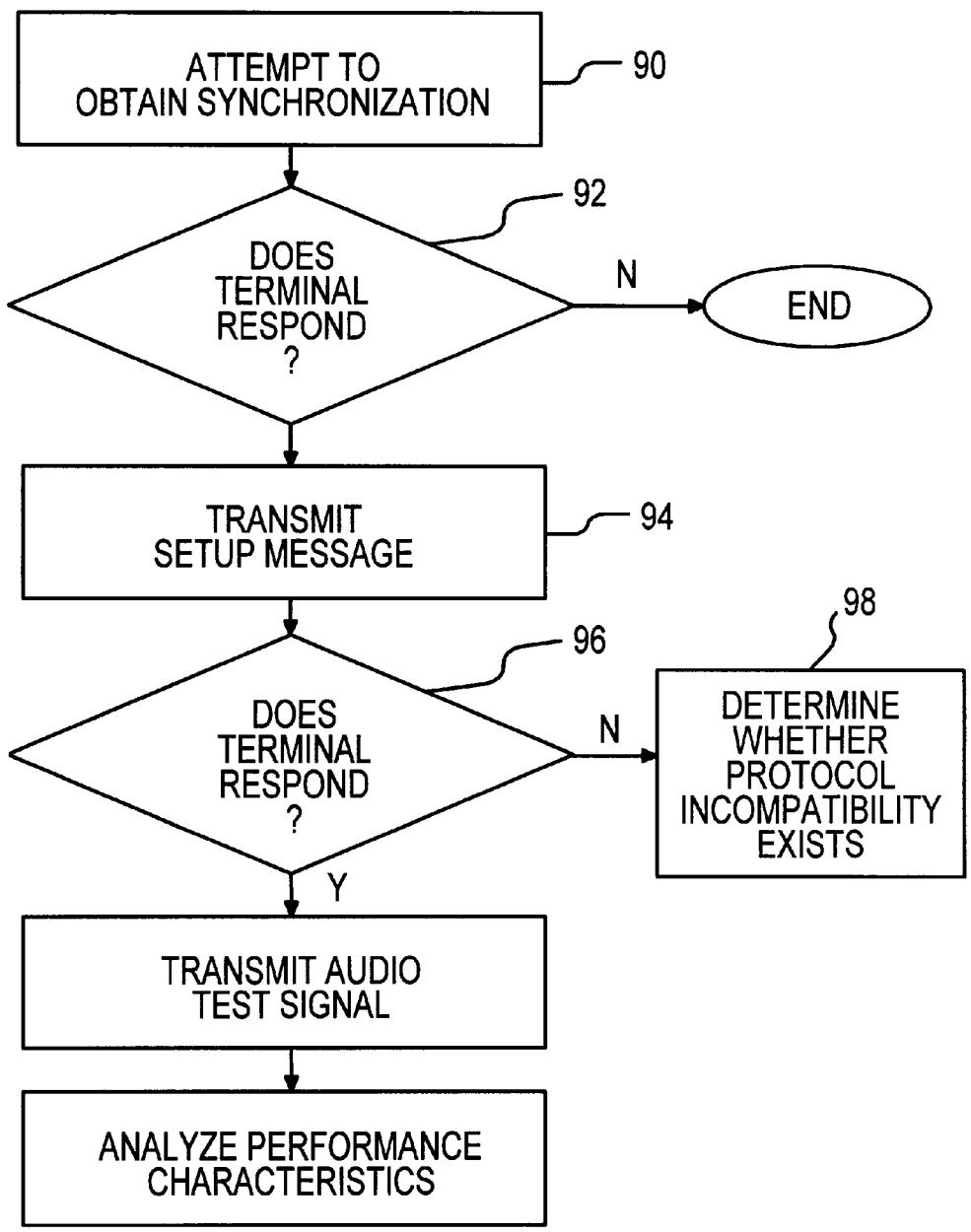
FIG. 6 is a flow diagram of a method for utilizing the IP telephony troubleshooting device of FIG. 1 to troubleshoot a LAN unattached to a gateway.

FIG. 6 illustrates a method for troubleshooting a LAN in which IP telephony terminals are not registered to a gateway. In step 90, the IP telephony troubleshooting device attempts to synchronize with an IP telephony terminal. In step 92, the IP telephony troubleshooting device 10 determines whether the terminal has synchronized with the troubleshooting device. If no response is forthcoming, then the connection between the IP telephony troubleshooting device and the IP telephony terminal is faulty or the IP telephony terminal is not functioning properly. If the IP telephony terminal responds with a message that it is unable to synchronize, then the connection can support at least data communication and the IP telephony terminal is not functioning properly. A functioning terminal might be placed at the same location to determine whether the connection is capable of supporting bidirectional audio communication.

If the IP telephony terminal responds to the clocking signals by signaling that the IP telephony terminal has synchronized to the clocking signals, then in step 94 the IP telephony troubleshooting device 10 transmits a Setup message to the IP telephony terminal. In step 96, the IP telephony troubleshooting device determines whether the IP telephony terminal has responded to the Setup message. If no Connect response to the Setup message is forthcoming, then in step 98 the IP telephony troubleshooting device determines whether a protocol incompatibility between the IP telephony troubleshooting device and the IP telephony terminal is responsible. A protocol incompatibility, as discussed above, indicates that the failure to establish a bidirectional audio communications link is not attributable to some malfunction in the LAN.

If the IP telephony terminal returns a Connect message in response to the Setup message, then a bidirectional audio communications link has been established. In step 100, the IP telephony terminal transmits an audio test signal together with signaling information directing the IP telephony terminal to return the audio test signals back to the IP telephony troubleshooting device. The IP telephony troubleshooting device monitors the connection to determine whether the audio test signal is received. If the audio test signal is not received, then either the IP telephony terminal is unable to return the audio test signal as instructed, or the connection between the IP telephony terminal and the IP telephony troubleshooting device is unable to support bidirectional audio communications. If the audio test signal is received, then in step 102 the signal is analyzed to determine the performance characteristics of the transmission. Such parameters as amplitude and frequency of the received signal can be measured and compared to the transmitted signal.

The method and device for troubleshooting IP telephony networks described herein enables IP telephony troubleshooting of a variety of networks for which no effective and efficient troubleshooting techniques have previously been available. Furthermore, the IP telephony adaptor embodiment of the invention allows technicians familiar with only analog telephony technology to employ an analog telephony troubleshooting device connected to the IP telephony adaptor to troubleshoot IP telephony networks.

What is claimed is:

1. A telephony troubleshooting device comprising:
   a plurality of alternative input/output connector members for connecting said telephony troubleshooting device to establish connectivity with an Internet protocol (IP) telephony network at one of a plurality of different sites within said IP telephony network;
   a system control, configured for an electrical association with said connector members, for transmitting and receiving digital control messages compatible with establishing an audio communication link over said IP telephony network via at least one selected connector member of said plurality of connector members;
   a system control user interface connected to said system control to enable a user of said telephony troubleshooting device to direct a call to a remote telephonic device; and
   means, operatively associated with said connector of said connector members, for enabling transmission and receipt of audio signals over said IP telephony network via said at least one selected connector member.

2. The telephony troubleshooting device of claim 1 wherein said enabling means includes an audio codec, connected to said connector members, for processing digital audio signals transmitted and received by said telephony troubleshooting device, a converter connected to said audio codec for converting a first digital audio signal received from said remote telephonic device by way of said at least one selected connector member to a first analog audio signal and for converting a second analog audio signal to a second digital audio signal transmitted to said remote telephonic device, said enabling means further including a speaker connected to said converter and responsive to said first analog audio signal and a microphone connected to said converter for converting speech into said second analog audio signal.

3. The telephony troubleshooting device of claim 1 wherein said IP telephony network is one of a local area network (LAN) and an intranet.

4. The telephony troubleshooting device of claim 1 wherein said connector members include at least one alligator clip for connecting to a cable of said IP telephony network, a first adaptor for connecting at one of a user wall jack and a HUB connection of said IP telephony network, and a second adaptor for connecting at a router port of said IP telephony network.

5. The telephony troubleshooting device of claim 3 wherein said remote telephonic device is a terminal unregistered to a gateway and within said LAN, said transmitted digital control messages include a Setup message transmitted to said terminal, and said received digital control messages include a Connect message received from said terminal.

6. The telephony troubleshooting device of claim 3 wherein said digital control messages are transmitted to and received from a gateway connected to said LAN, said transmitted digital control messages include an admission request (ARQ) message, and said received control messages include one of an admission confirmation (ACF) message and an admission reject (ARJ) message.

7. The telephony troubleshooting device of claim 2 further comprising:
   a video monitor for displaying a video sequence connected to said converter;
   a video codec connected to said converter for processing video signals for transmission by said telephony troubleshooting device over said IP telephony network and for processing video signals received by said telephony troubleshooting device over said IP telephony network to be displayed on said video monitor; and
   non-volatile memory connected to said video codec for storing a video sequence for transmission by said telephony troubleshooting device over said IP telephony network.

8. A method for troubleshooting on an IP telephony network comprising the steps of:
   connecting a telephony troubleshooting device to said IP telephony network;
   transmitting a first digital telephony signal from said telephony troubleshooting device via said IP telephony network to a remotely located device, including generating said first digital signal to contain information requesting a return digital telephony signal from said remotely located device, said digital telephony signal exchange between said telephony troubleshooting device and said remotely located device being dedicated to establishing bidirectional audio communication capability over said IP telephony network; and monitoring said connection between said telephony troubleshooting device and said remotely located device to determine whether said return digital telephony signal is received.

9. The method of claim 8 comprising the further steps of:

if it is determined from said monitoring step that said return digital signal is received, executing a loopback call wherein an audio test signal is transmitted over said IP telephony network, said loopback call being directed to an address assigned to said telephony troubleshooting device;

determining whether said audio test signal is received by said telephony troubleshooting device; and if said audio test signal is received by said telephony troubleshooting device, analyzing said received audio test signal to determine performance characteristics of said transmission of said audio test signal over said IP telephony network.

10. The method of claim 8 wherein said transmitting step includes attempting to synchronize said remotely located device with said telephony troubleshooting device and said monitoring step includes monitoring said connection to establish whether said remotely located device has synchronized with said telephony troubleshooting device.

11. The method of claim 8 wherein said transmitting step includes transmitting said first digital telephony signal to said remotely located device that is a gateway connected to said IP telephony network and comprising the further step of:

after said return digital signal has been received, placing a call to a remote telephonic device to determine whether at least a portion of said IP telephony network is capable of supporting bidirectional audio communication.

12. The method of claim 8 wherein said connecting step takes place within a LAN at one of a wall jack connected to a cable of said LAN, a hub connection, a router port connection, and one of a plurality of sites within said LAN utilizing an alligator clip to connect said telephony troubleshooting device to said IP telephony network.

13. The method of claim 8 wherein said monitoring step includes making a determination of bandwidth availability of said connection between said remotely located device and said telephony troubleshooting device and determining whether a protocol incompatibility is responsible for a communication failure between said telephony troubleshooting device and said remotely located device.

14. The method of claim 8 comprising the further steps of:

if it is determined from said monitoring step that said return digital signal is received, executing a loopback call wherein a video sequence is transmitted over said IP telephony network, said loopback call being directed to an address assigned to said telephony troubleshooting device;

determining whether said video sequence is received by said telephony troubleshooting device; and if said video sequence is received by said telephony troubleshooting device, analyzing said received sequence to determine performance characteristics of said transmission of said video sequence over said IP telephony network.

15. The method of claim 12 wherein said transmitting step includes transmitting said first digital telephony signal that is a Setup message to said remotely located device that is a terminal unregistered to a gateway, and wherein said return digital telephony signal is a Connect message.

16. An IP telephony adaptor for an analog telephony troubleshooting device comprising:

an electrical circuit connected to said analog telephony troubleshooting device for converting an analog DTMF signal generated by said analog telephony troubleshooting device to a first digital control message;

a system control, connected and responsive to said electrical circuit, for transmitting said first digital control message over an IP telephony network and for receiving a second digital control message, said transmission and receipt of said first and second digital control messages being necessary to establish a bidirectional audio communications link between said IP telephony adaptor and a remote telephonic device over said IP telephony network;

a converter connected to a microphone and a speaker of said analog telephony troubleshooting device for converting a first digital audio signal received from said remote telephonic device to a first analog audio signal transmitted to said speaker and for converting a second analog audio signal generated by said microphone to a second digital audio signal transmitted to said remote telephonic device;

a plurality of connectors, each individual connector designed for connecting said IP telephony adaptor to said IP telephony network at a different site on said network; and an audio codec, connected to said converter and one of said plurality of connectors, for processing digital audio signals transmitted and received by said IP telephony adaptor.

17. The IP telephony adaptor of claim 16 wherein said plurality of connectors includes an alligator clip for connecting to a cable of said IP telephony network, a first adaptor for connecting to one of a user wall jack and a HUB connection of said IP telephony based network, and a second adaptor for connecting at a router port of said IP telephony network.

18. The IP telephony adaptor of claim 16 wherein said IP telephony network includes a LAN, said server is a gateway on said LAN, and said first digital control message transmitted to said gateway is an ARQ message, and said second digital control message received from said gateway is one of an ARJ message and an ACF message.

19. The IP telephony adaptor of claim 16 wherein one of said plurality of connectors is utilized to connect said IP telephony adaptor to a LAN, said remote device is a terminal on said LAN and is unregistered to a gateway, said first digital control message transmitted to said terminal is a Setup message, and said second digital control message received from said terminal is a Connect message.

20. The IP telephony adaptor of claim 16 wherein one of said plurality of connectors is enabled to connect said IP telephony adaptor at a site within a LAN that is one of a wall jack connected to a cable of said LAN, a hub connection, and a router port connection.

* * * * *